J. BEYNON.
RESILIENT TIRE FOR VEHICLES.
APPLICATION FILED NOV. 7, 1914.
1,185,281.
Patented May 30, 1916.
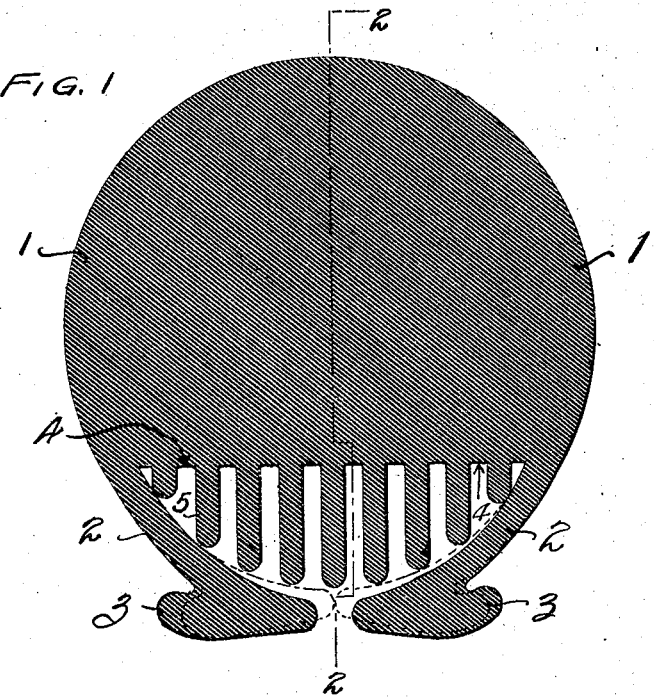
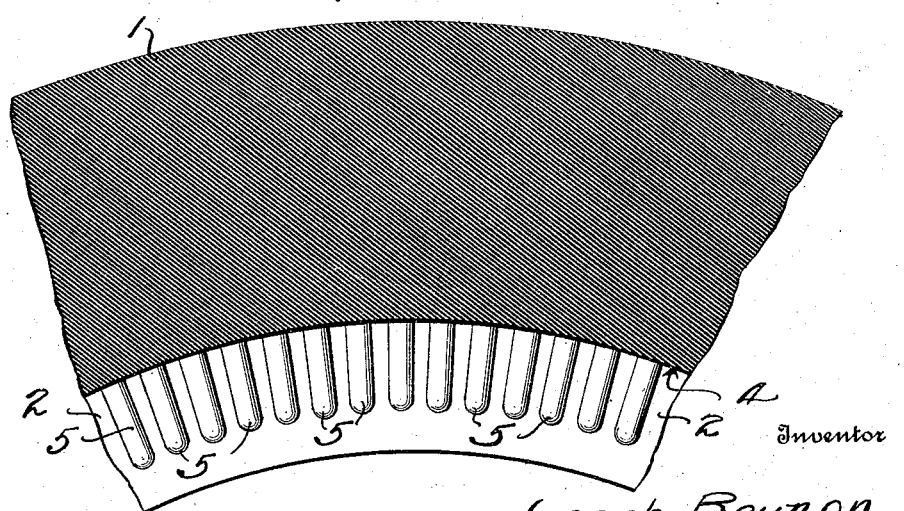
Witnesses
Inventor
Joseph Beynon
By W. C. Carman
Attorney

UNITED STATES PATENT OFFICE.

JOSEPH BEYNON, OF YOUNGSTOWN, OHIO.

RESILIENT TIRE FOR VEHICLES.

1,185,281.  Specification of Letters Patent.  Patented May 30, 1916.

Application filed November 7, 1914. Serial No. 870,861.

*To all whom it may concern:*

Be it known that I, JOSEPH BEYNON, citizen of the United States, residing at Youngstown, in the county of Mahoning and State of Ohio, have invented certain new and useful Improvements in Resilient Tires for Vehicles, of which the following is a specification.

This invention relates to an improved resilient tire for vehicles particularly intended as a substitute for the conventional pneumatic tire ordinarily employed on the wheels of motor vehicles.

The primary object of the invention is to combine, in a novel and practical manner, the structural and functional characteristics of both a solid and hollow cushion tire, whereby the durability and puncture-proof properties of a solid rubber tire may be obtained in a tire body which also possesses, to a marked degree, the resiliency of the hollow or partly hollow forms of cushion rubber tires. While a solid rubber tire represents the ideal form of tire from the standpoint of effectually obviating the faults of a pneumatic tire due to puncture or blow-outs, and is also very durable, yet at the same time a solid rubber tire is deficient in elasticity, and, for other practical reasons, is not available as a substitute for the conventional design of pneumatic or cushion tires which are usually applied detachably to the wheel rims of motor vehicles. Accordingly, the present invention has in view the desirable feature of adding sufficient resiliency to a solid cushion tire, of rubber or rubber composition, to render the same available for use in the same manner as an ordinary pneumatic automobile tire. Also, to so arrange the supplemental cushioning means as to place such means directly adjacent the rim-engaging portions of the tire so as to effectually cushion such portions of the tire and the wheel rim from shocks or stresses imposed upon the tire body in any direction.

With these and other objects in view which will readily appear to those familiar with the art as the details of the invention are fully understood, the same consists in the novel construction and combination of elements hereinafter described, illustrated, and claimed.

A preferable form of construction is shown in the accompanying drawings, in which—

Figure 1 is a cross sectional view of a resilient tire for vehicles embodying the present invention. Fig. 2 is a central longitudinal sectional view of a portion of the tire body on the line 2—2 of Fig. 1.

Similar reference characters designate corresponding parts in the several figures of the drawings.

In carrying out the invention, a feature thereof resides in giving to the tire body the conventional form and external construction of the ordinary pneumatic tire casings now on the market, so as to be freely interchangeable therewith, and readily adaptable to standard demountable and quick-detachable wheel rims such as employed on the wheels of motor vehicles. At the same time, the tire of the present invention is not subject to blow-outs, nor to collapse by puncture, and yet affords sufficient resiliency for easy riding and for the proper protection of the wheel rims. These desirable properties are obtained by a novel combination of solid and hollow effects in the same tire body, and referring to the means employed it will be observed by reference to the drawings that the tire body, designated by the numeral 1, is of a solid formation for approximately three-quarters of its cross sectional area, thereby presenting substantially a solid resilient body of rubber or rubber composition as the main wearing portion of the tire. This solid cylindrical body portion 1 of the tire is provided at its opposite inner side edges with the flexible curved and inwardly extending fastening flaps 2 which are to be applied to the wheel rim in the ordinary manner, and are usually formed with the clencher beads or hooks 3 which interlock with the tire-holding elements on the rim. In connection with the opposite inwardly extending flaps 2 and the solid body portion of the tire, a distinctive feature thereof resides in having the inner circumferential portion of the body, inside of the flaps 2, truncated transversely on a straight line, or substantially straight line, thereby forming an interior flat base 4. From this flat base projects an inner circumferential field of radially projecting cushioning studs 5 of varying length. These studs are of rubber or rubber composition, and are formed integrally with the solid resilient body of the tire or otherwise permanently and homogeneously united therewith, as by vulcanization. Also, the said studs may be arranged in rows, or staggered, or promiscuously, it only being necessary to provide a field of studs to substantially fill the entire segment between the base 4 and the flaps 2. In this latter connection, it will be observed that the said cushioning studs are graduated in length so as to progressively decrease in length toward the side portions of the tire, and thus evenly fill the hollow segment referred to, when the flaps 2 are closed in, as indicated by dotted lines, when attached to the wheel rim.

When the tire is attached to the wheel rim and the elements are related as indicated by the dotted lines in Fig. 1, it will be obvious that the inside field of studs provide an effective cushion immediately over and about the fastening elements of the tire, thus protecting the wheel rim from sharp shocks while at the same time producing a maximum cushioning effect for the solid part of the tire, regardless of the direction in which blows or stresses are imparted thereto.

From the foregoing, it is thought that the construction and useful functions of the improved tire will now be apparent without further description.

I claim:

1. A resilient tire comprising a substantially circular body portion of a solid formation for the major portion of its cross-sectional area and provided with external inwardly projecting fastening flaps and with an inner circumferential field of integral cushioning studs occupying the non-solid part of the tire within the smaller area thereof, the said studs projecting from the main solid body portion into close proximity to the said flaps.

2. A resilient tire comprising a solid body portion having inwardly extending fastening flaps at its inner side edges, and an inner circumferential field of cushioning studs overlying the flaps, said studs progressively decreasing in length toward the side portions of the tire.

In testimony whereof I hereunto affix my signature in the presence of two witnesses.

JOSEPH BEYNON.

Witnesses:
  HORACE T. SMITH,
  AGNES A. JOHNSTON.

Copies of this patent may be obtained for five cents each, by addressing the "Commissioner of Patents, Washington, D. C."